Nov. 29, 1966  H. D. HAZZARD  3,289,058
CAPACITOR
Filed May 5, 1965
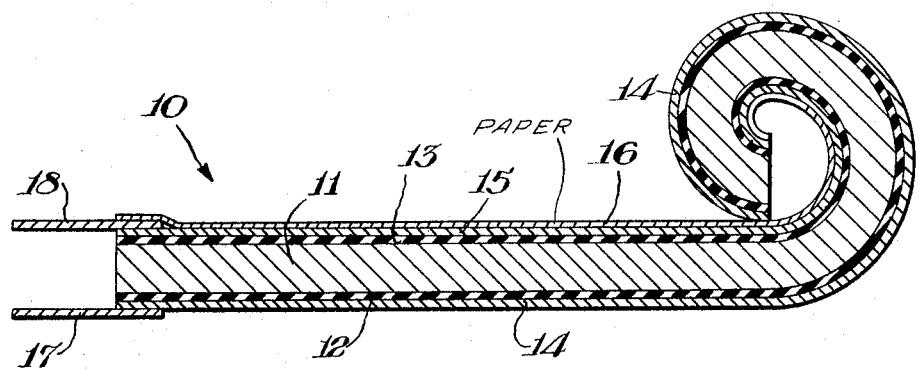
INVENTOR
Henry D. Hazzard
BY Connolly and Hutz
ATTORNEYS

3,289,058
CAPACITOR
Henry D. Hazzard, Williamstown, Mass., assignor to Sprague Electric Company, North Adams, Mass., a corporation of Massachusetts
Filed May 5, 1965, Ser. No. 453,416
3 Claims. (Cl. 317—258)

The present invention relates to electric capacitors and more particularly to nonpolar capacitors.

An object of the present invention is to present a new nonpolar capacitor.

Other objects and advantages of the present invention will be made obvious to those skilled in the art by the following decription when considered in relation to the accompanying drawing of which:

The figure is a cross-sectional view of a capacitance section within the scope of the present invention.

In accordance with the present invention the novel capacitor comprises a valve metal foil convolutely wound with an insulating spacer material. The foil has a dielectric compound of the same valve metal coated on opposite sides thereof. A pair of electrodes are positioned on said coated surfaces. The foil, dielectric coated surfaces and electrode arrangement define a pair of series connected capacitors.

Referring to the drawing which depicts an example of the present invention; this capacitor 10 comprises an aluminum foil 11 which has aluminum oxide films 12 and 13 formed on both sides thereof and a pair of nickel electrodes 14 and 15 positioned over the oxide films. An insulating spacer film 16 e.g. paper, is positioned over electrode 15 so as to prevent electrodes 14 and 15 from shorting when the unit is convolutely rolled into a compact capacitance section. Electrode tabs 17 and 18 are affixed to electrodes 14 and 15 respectively.

It will be noted that no lead is attached to aluminum foil 11. This arrangement defines a pair of capacitors connected in series. One capacitor is electrode 15 and foil 11 separated by the aluminum oxide film 13, the other capacitor is electrode 14 and foil 11 separated by aluminum oxide film 12. Aluminum foil 11 is the common electrode, series connecting the two capacitors.

An advantage of the present construction, as regards A.C. applications, is that the voltage divides approximately equally and thus the capacitor can be operated at a substantially higher (approaching two times) voltage, as compared with a single dielectric. An advantage as regards D.C. applications is that even if the voltage gradient is non-linear, the maximum voltage gradient is substantially less than with the use of a single dielectric of twice the thickness.

The capacitor is prepared by anodizing a length of aluminum foil on both sides. Applying electrodes of metal or a combination of metal and graphite to both sides of the formed foil. Electrode tabs or leads are affixed to the electrodes and a dielectric spacer material is positioned over one of the electrodes. This arrangement is then convolutely rolled into a compact capacitance section which is packaged in a suitable protective container e.g. a metal can, a plastic case, etc.

The particular protection means covering the capacitor is not critical and obviously will depend upon the use to which the component will be put and the environment to which it will be subjected.

While aluminum foil has been employed for purposes of illustration it is to be understood that any valve metal is operable, for example, tantalum, titanium, zirconium, niobium, etc. can also be used. The foil may be worked or surface modified in any manner designed to increase the surface area thereof. The electrodes may consist of any of the commonly used electrode materials known to the art.

Since it is obvious that many changes and modifications can be made in the above-described details without departing from the nature and spirit of the invention, it is to be understood that the invention is not limited to said details except as set forth in the appended claims.

What is claimed is:

1. A capacitor consisting essentially of a valve metal foil convolutely wound with an insulating spacer material, said foil having a dielectric compound of the same valve metal formed on opposite surfaces thereof, an electrode positioned on each of said formed surfaces, terminals affixed to said electrodes, said foil, dielectric coated surfaces and electrode arrangement defining a pair of series connected capacitors.

2. A capacitor consisting essentially of a valve metal foil convolutely wound with an insulating spacer material, said foil having an oxide formed on both surfaces thereof and an electrode positioned on each of the formed surfaces, terminals affixed to said electrodes, said foil, oxide formed surfaces and electrode arrangements defining a pair of series connected capacitors.

3. The capacitor of claim 2 wherein the valve metal is aluminum.

References Cited by the Examiner
UNITED STATES PATENTS

| | | | |
|---|---|---|---|
| 2,088,949 | 8/1937 | Fekete | 317—258 |
| 2,408,910 | 10/1946 | Burnham | 317—258 |
| 3,042,846 | 7/1962 | Lawson. | |
| 3,149,399 | 9/1964 | Sprague et al. | 317—258 X |

FOREIGN PATENTS 407,250   9/1944   Italy.

LEWIS H. MYERS, *Primary Examiner.*

JOHN F. BURNS, ROBERT K. SCHAEFER,
*Examiners.*

D. J. BADER, E. GOLDBERG, *Assistant Examiners.*